United States Patent Office 2,973,045
Patented Feb. 28, 1961

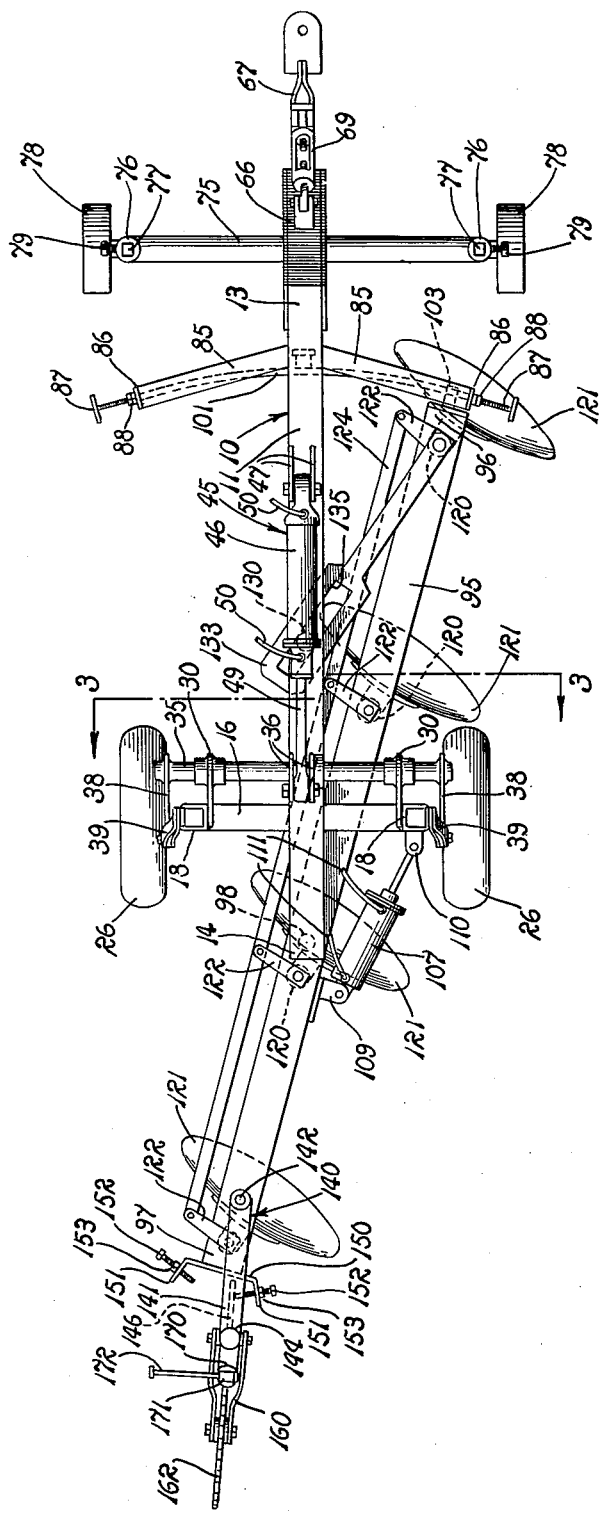

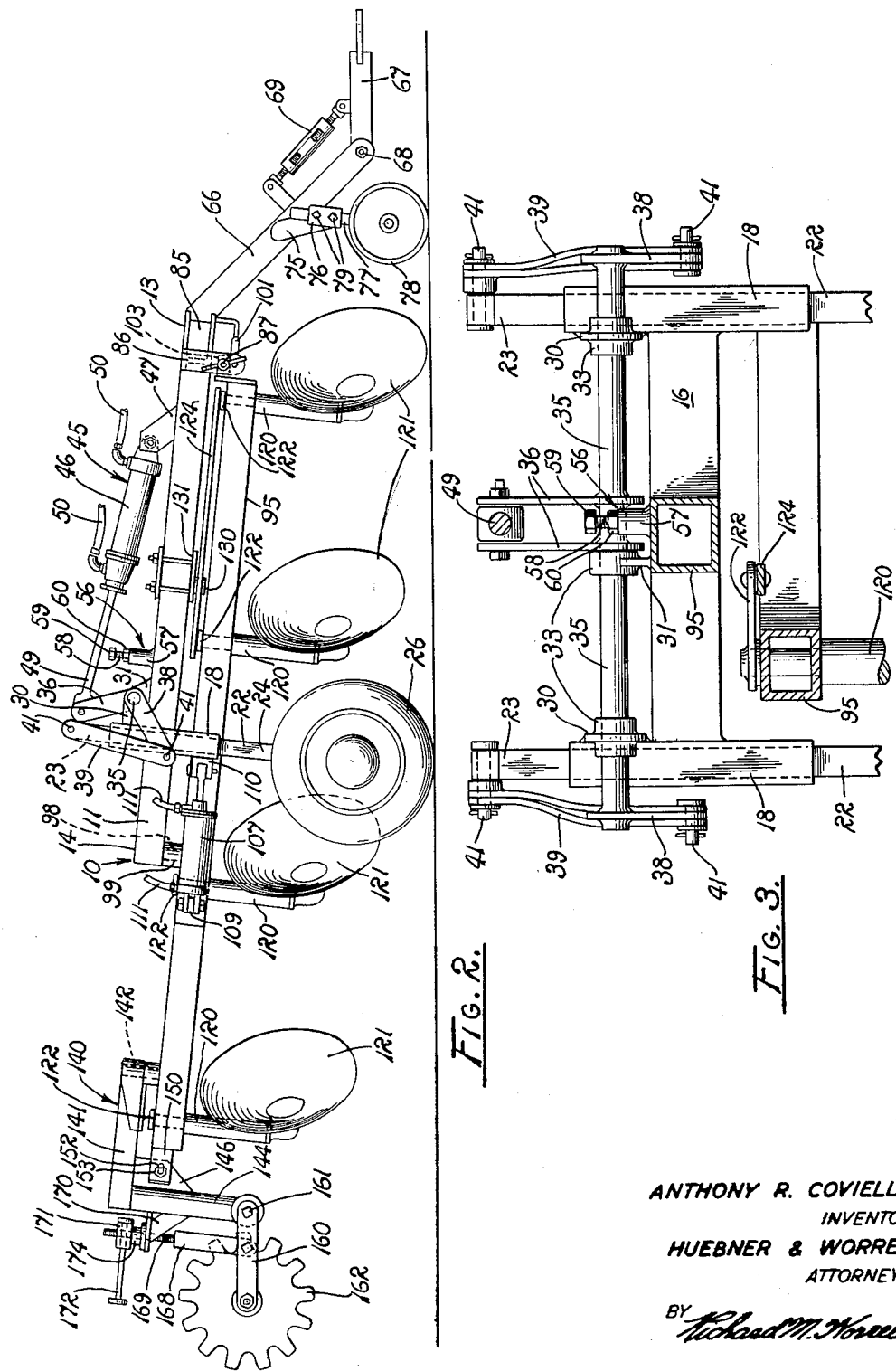

2,973,045

REVERSIBLE DISC PLOW

Anthony R. Coviello, P.O. Box 208, Tulare, Calif.

Filed Dec. 22, 1958, Ser. No. 782,274

6 Claims. (Cl. 172—222)

The present invention relates to a reversible disc plow and more particularly to such a plow having a novel and improved relation between a plow beam, disc blades borne by the beam, and ground engaging support wheels employed in the plow conducive to better maneuverability, utility, and operating convenience.

Reversible disc plows have become popular for many farming purposes but have been subject to certain difficulties which have restricted their full utility. Whether borne by a tractor or towed on their own support wheels, such plows have not been as conveniently manipulable as desired. In many instances because of their requisite frame structure, the position of their ground support wheels, or the like, they have been incapable of plowing in close proximity to fences, tree rows, and other obstructions. The larger reversible disc plows, which have been too heavy to be borne by a tractor, have been of such width as to preclude road travel or have been difficult and hazardous to draw along the road. Such plows have also imposed excessive weight on tractors with which they are used, have been difficult to couple and uncouple, and in many instances exceedingly cumbersome to employ.

An object of the present invention, therefore, is to provide a more manipulable reversible disc plow.

Another object is to provide a reversible disc plow characterized by an adaptability to embodiment in a wide range of sizes without impairing maneuverability or requiring excess width for road travel and convenient handling.

Another object is to provide a reversible disc plow capable of plowing closer to fences, tree rows, and other obstructions than those previously known.

Another object is to provide a reversible disc plow which is able to plow to each side laterally beyond its frame and ground support structure.

Another object is to provide a reversible disc plow which can conveniently and easily be coupled to a tractor, or the like, and uncoupled therefrom.

Another object is to minimize the weight imposed by a disc plow on a tractor.

Another object is to provide a reversible disc plow which is substantially balanced on support wheels provided therefor.

Another object is to provide a reversible disc plow which is easier to shift between operable positions, easier to hold in adjusted position, and subject to less side draft than previously regarded as inescapable in reversible disc plows.

Further objects are to provide an improved plow of the character described which has a simplified structure, which is more economical to produce, which is durable and dependable, and which has improved facility for elevational control.

Still further objects and advantages will become apparent upon reference to the subsequent description in this specification.

In the drawings:

Fig. 1 is a top plan view of a reversible disc plow embodying the principles of the present invention and adjusted to discharge encountered earth laterally to the right of a line of travel.

Fig. 2 is a side elevation of the reversible plow of Fig. 1 illustrating the support frame and plow beam together with the disc plows in an elevated position with respect to the support wheels.

Fig. 3 is a somewhat enlarged, fragmentary, transverse, vertical section taken on line 3—3 of Fig. 1.

Referring more particularly to the drawings, a support frame preferably of box steel is generally indicated by the numeral 10 and is best understood by reference to Figs. 1 and 2. The frame includes an elongated longitudinal member 11 having opposite forward and rearward end portions 13 and 14, respectively, and a transverse member 16 rigidly connected to the longitudinal member in adjacent spaced relation to its rearward end portion and in substantially right-angular relationship to the longitudinal member. The transverse member has opposite ends, and tubular sleeves 18, preferably having openings therethrough of rectangular or other polygonal cross-section, are rigidly connected to the opposite ends of the transverse member in substantially upright positions.

Elongated legs 22 are longitudinally slidably fitted in the sleeves 18 and have upper and lower ends 23 and 24. Ground engaging support wheels 26 are rotatably connected to the lower ends of the legs in coaxial relation to each other, on opposite sides of the longitudinal frame member 11, and in parallel planes substantially equally spaced from, and parallel to, a central vertical plane containing the longitudinal frame member. The upper ends of the legs extend upwardly from the sleeves.

Brackets 30 are rigidly secured to the sleeves 18 above the transverse frame member 16 and forwardly extended therefrom. A bracket 31 is rigidly upwardly extended from the longitudinal frame member 11. Coaxially aligned bearings 33 are mounted in the brackets 30 and 31, and a rocker shaft 35 is journaled in these bearings so as to extend transversely of the longitudinal frame member forwardly of, and substantially parallel to, the transverse frame member 16. Levers 36 are rigidly connected generally centrally to the adjacent spaced inner ends of the rock shaft and rigidly upwardly extended therefrom. Radius arms 38 are rigidly connected to the remote outer ends of the rock shaft and radially extended from the shafts in angular relation to the levers. Links 39 pivotally interconnect the outer ends of the radius arms and the upper ends 23 of the legs 22 by means of pins 41.

An hydraulic elevational control ram 45 provides a cylinder 46 pivotally connected by means of a bracket 47 to the longitudinal frame member 11 forwardly of the transverse frame member 16, and a piston rod 49 pivotally connected to the levers 36. The ram has fluid hoses 50 adapted to deliver and remove fluid to and from the cylinder, as is well known in the art. When the ram is extended, the rock shaft 35 is rotated in a counterclockwise direction, as viewed in Fig. 2, so as to apply pressure downwardly on the legs 22 thereby to elevate the frame 10 on the support wheels 26. Conversely, when the ram is retracted, the frame is allowed to descend relative to the support wheels.

An elevational control stop is generally indicated by the numeral 56 in Fig. 2 and includes an upwardly disposed receptacle 58 rigidly connected to the longitudinal frame member 11 in forwardly adjacent spaced relation to the rock shafts 35. A bolt 58 is a screw-threaded into the receptacle and provides an upwardly disposed head 59.

A jamb nut 60 is provided on the bolt for tightening against the receptacle thereby to enable adjustment of the position of the bolt in the receptacle. The head is located so as to be engaged by the piston rod 49 upon predetermined rotation of the rock shaft 35 in a clockwise direction, as viewed in Fig. 2, thereby to limit the downward movement of the frame 10 relative to the support wheels 26.

Elongated draft arms 66 are rigidly forwardly extended from the forward end portion 13 of the frame 10, and an elongated tongue 67 is pivotally connected to the arms by means of a pin 68 disposed transversely of the longitudinal frame member 11. A turnbuckle 69 pivotally interconnects the draft arms and the tongue for enabling adjustment in the angularity between the tongue and the arms.

With particular reference to Fig. 1, elongated bars 75 are rigidly connected in right-angular relationship to the draft arms 66 and extend laterally on opposite sides of the frame 10. Upright sleeves 76 having openings therethrough of rectangular or other polygonal cross section are rigidly connected to outer ends of the bars, and legs 77 of complementary cross section are elevationally slidably received in the sleeves. Depth control or gage wheels 78 are rotatably mounted on the legs, and setscrews 79 are screw-threadably extended through the sleeves for engagement with the legs thereby to enable locking the legs in elevational adjustment, and thus the depth control wheels in desired position. As will soon be apparent, only one depth control wheel is utilized at a time.

As described thus far, it will be evident that the support wheels 27 mount the frame 10 for earth traversing movement in a predetermined line of travel coincident with the longitudinal frame member 11 and normal to the axis of rotation of the wheels 27. Further the depth control wheels 78 are provided for limiting forward tilting of the frame during plowing operations and are utilized only during plowing or standing and not for non-plowing travel.

Also, by reference to Fig. 1, it will be noted that elongated wings 85 are rigidly laterally and rearwardly outwardly extended from the forward end portion 13 of the longitudinal frame member 11 in acute angularity with respect to the longitudinal frame member. The wings provide downwardly extended outer ends 86, and stop bolts 87 are screw-threaded inwardly of the outer ends of the wings. Jamb nuts 88 are provided on the stop bolts to enable adjustment and locking of the stop bolts in predetermined positions.

An elongated plow beam 95, also preferably of box steel, provides a forward end 96, a rearward end 97, and is connected to the rearward end portion 14 of the frame 10 by means of an upright pivot bolt 98 intermediate the forward and rearward ends of the beam and so that the beam extends between the support wheels underneath the frame members 11 and 16. The pivot bolt is preferably nearer one end of the beam 95 than the other, in this instance being nearer the rearward end. A spacer 99 is interposed the plow beam and the longitudinal frame member 11 of the frame. An elongated arcuate rail 101 is mounted underneath the longitudinal frame member at the approximate position of the wings 85 and substantially coextensive therewith and in substantially concentric relation to the pivot bolt 98. A roller 103 is rotatably mounted on the forward end 96 of the plow beam for rotation about an axis disposed longitudinally of the plow beam. The roller rests on the rail for rolling engagement therewith. The beam is thus mounted for horizontal pivoting or swinging movement between opposite operational positions on opposite sides of the longitudinal frame member 11. The roller is adapted for engagement with the stop bolts 87 in the opposite operational positions of the plow beam thereby to limit the extent of movement of the beam. Although the stop bolts are adjustable, as described, the angles between the beam and the longitudinal frame member in the opposite operational positions of the beam are preferably substantially equal. Further, it is to be noted that the spacing between the support wheels 26 is less than the maximum distance between the opposite operational positions of the forward end 96 of the plow beam.

For swinging the beam 95 between its opposite positions, a beam control ram 107 pivotally interconnects the frame 10 and the plow beam. Specifically, a frame bracket 110 is rigidly connected adjacent to an outer end of the transverse frame member 16, and a beam bracket 109 is rigidly connected to the plow beam rearwardly adjacent to the pivot bolt 98. The ram includes a cylinder pivotally connected to the beam bracket and a pivot rod pivotally connected to the frame bracket. Hoses 111 are connected to the ram for conducting hydraulic fluid to and from the ram. Upon extension of the ram, the beam is pivoted in a clockwise direction, as viewed in Fig. 1, and upon retraction of the ram, the beam is pivoted in a counterclockwise direction, as viewed in Fig. 1.

A plurality of tool posts 120 are rotatably mounted in the beam 95 in substantially equally spaced relation and downwardly extended therefrom. It is to be noted that the spacing between adjacent tool posts is sufficient to accommodate the support wheels 26 therebetween. Thus, the innermost tool posts are spaced on opposite sides of the transverse frame member 16. A plow disc blade 121 is rotatably mounted on the lower end of each post for earth engagement. The blades 121 are spaced sufficiently to receive the wheels 26 therebetween. Plow control arms 122 are rigidly radially extended from the upper ends of the tool posts above the plow beam, and a rigid elongated push-pull bar 124 extends lengthwise of the plow beam and is pivotally connected to the plow control arms in radially spaced relation to the tool posts for correspondingly rotating the tool posts, and thus the blades, incident to longitudinal movement of the push-pull bar.

A camming roller 130 is mounted in upright position on and beneath the longitudinal frame member 11 between the transverse frame 16 and the forward end portion 13 of the frame 10. The roller is mounted on a bracket 131 for adjustable movement longitudinally of the frame into predetermined positions on the frame member 11. An elongated plow position arm 133 is rigidly radially extended from the forwardmost tool post 120 in substantially right-angular relation to its respectively adjacent plow control arm 122. The plow positioning arm has an elongated longitudinally disposed slot 135 slidably receiving the roller and thus extending underneath the longitudinal frame member. When the ram 107 is operated to swing the plow beam 95 between its opposite operational positions, the plow positioning arm 133 rotates the blades 121 so that they discharge encountered earth laterally outwardly from the side of the frame 10 on which the plow beam is positioned. Thus, in Fig. 1, the blades discharge such earth laterally toward the right of the forward direction of travel of the frame. When the beam is in the opposite position, that is toward the left of the longitudinal frame member, the blades are adjusted so as to discharge earth laterally toward the left. In this respect, the operation of the plow is similar to that shown and described in my United States Patent No. 2,600,359.

A tail wheel bracket 140 includes a beam connecting member 141 mounted on the rear end 97 of the beam 95 by means of a pivot bolt 142 for swinging movement in a plane parallel to the beam. The tail wheel bracket also has a wheel mounting portion 144 downwardly extended from the beam portion rearwardly of the rear end of the plow beam. A stop plate 146 is connected to the portions of the wheel bracket within the acute angle defined therebetween and is also located in rearwardly spaced relation to the plow beam.

A U-shaped holder 150 provides a central portion connected to the rear end 97 of the plow beam 95 and a pair of rearwardly outwardly angularly extended ears 151 disposed on opposite sides of the stop plate 146. Stop bolts 152 are screw-threaded inwardly through the ears, and jamb nuts 153 are turned on the bolts for tightening against the ears. The tail wheel bracket is thus mounted for free swinging movement on the plow beam and is limited in its extent of movement toward the opposite sides of the beam by engagement of the stop bolts with the stop plate. Thus, extent of movement of the bracket can be adjusted with the bolts 152.

A yoke 160 is pivotally connected by means of a pin 161 to the wheel portion 144 of the tail wheel bracket 140 and extends rearwardly therefrom. A tail wheel 162 is rotatably mounted on the yoke and is adapted for ground engagement upon lowering of the frame 10 relative to the ground support wheels 26. Of course, the tail wheel is mounted for swinging movement relative to the plow beam 95 by the described tail wheel bracket.

A shank 168 is pivotally connected to the yoke 160 rearwardly of the pin 161, and a screw 169 is upwardly extended from the shank and extended through a bracket 170 rigidly rearwardly mounted on the wheel portion 144 of the tail wheel bracket 140. A collar 171 circumscribes the screw, and a handle 172 is longitudinally slidably diametrically extended through the collar and the screw. A nut 174 is interposed the collar and the bracket, is screw-threaded on the screw, and is rigid with the bracket. By rotating the handle, it will be evident that the elevational position of the tail wheel 162 can be adjusted by threading the screw up and down on the nut.

Operation

The operation of the described embodiment of the subject invention is believed to be readily apparent and is briefly summarized, as follows.

The plow beam control ram 107 is either expanded or retracted to position the plow beam 95 on the desired side of the frame 10. It is limited in its maximum outward swing by engagement with the respectively adjacent stop bolt 87 and is held in this position by locking the ram 107 and/or by earth engagement. As stated above, the blades 121 are angled by the plow positioning arm 133 so as to discharge encountered earth laterally outwardly of the frame and the plow beam. It is to be observed that the blades are so positioned and spaced on the beam in reference to the support wheels 26 that during swinging movement of the beam between its opposite operational positions, the adjacent blades on opposite sides of the support wheels move in arcuate paths extending forwardly and rearwardly of the support wheels and without interference or contact with the support wheels.

It is to be understood that the axis of the support wheels 26 extends approximately through the center of gravity or balance of the plow. Accordingly, the plow is easy to connect to, or disconnect from, a tractor, not shown, by means of the tongue 67. After the plow is coupled to the tractor, or other prime mover, the setscrew 79 of the gage wheel at the side of the frame toward which the beam is directed is loosened elevationally to adjust its said gage wheel. When the gage wheel is lowered to the desired position limiting the depth of earth engagement of the forward blade 121, the setscrew is tightened. The opposite depth gage wheel is raised and held out of ground engagement.

The elevational control ram 45 is then contracted to lower the support frame 10 on the support wheels 26 thereby to bring the blades 121 and tail wheel 162 into earth engagement. It is sometimes necessary further to adjust the elevational position of the tail wheel by means of the handle 172. The ram 45 locks the beam 95 in predetermined elevational position during operation of the plow. The downward movement of the plow beam, however, is limited by engagement of the rod 49 with the stop bolt 58.

With the plow adjusted in the manner described and connected to a prime mover, not shown, the plow is drawn over earth to be plowed. Assuming that the plow beam 95 is in the position illustrated in Fig. 1, the beam is supported at three points, by the support wheels 26 intermediate its opposite ends 96 and 97, by the right depth control wheel 78 forwardly of the forward end, and by the tongue. The tail wheel 162 is a thrust resisting wheel and bears only sufficient weight to insure proper thrust resisting operation. As the plow moves forwardly, the blades 121 discharge earth outwardly toward the right of the forward direction of travel of the plow and set up a side thrust tending to pivot the plow toward the left of the forward line of travel of the plow. This side thrust angles the tail wheel bracket 140 in a counterclockwise direction, as viewed in Fig. 1, into its position relatively toward the right of the plow beam in engagement with the respectively adjacent stop bolt 152. The tail wheel thus resists the tendency of the plow to pivot toward the left and counteracts the side thrust.

Because the support wheels 26 and the depth control wheels 78 are spaced inwardly of the forwardmost plow blade 121, the plow can work effectively close to fences, rows of trees, and the like. That is, the forward blade works the earth laterally outwardly of the outermost portion of the frame 10, support wheels 26, and all other parts of the plow structure. This has never previously been possible with known reversible disc plows.

If it is desired to transport the plow along a road, the elevational control ram 45 is extended to raise the frame 10 and plow beam 95 on the support wheels 26. This raises the blades 121, thrust resisting colter 162 and gage wheels 78 free of the ground. The ram 107 is preferably manipulated to align the beam 95 with the frame member 11. Again, because of the close spacing of the support wheels 26 and depth control wheels 78, travel along regular highways is permissible as well as along narrow passages and between obstructions. Whether during plowing, transportation from place to place, or connecting and disconnecting operations, the balancing of the plow on the support wheels reduces the effective weight imposed by the plow on its drawing vehicle, such as a tractor. This makes the plow more maneuverable, and easier to handle than the reversible disc plows of the prior art.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A reversible disc plow comprising an elongated frame having predetermined forward and rearward end portions and opposite sides; means mounted on the forward end portion of the frame adapted to connect the frame to a draft appliance; a beam pivotally mounted in the rearward end portion of the frame and forwardly extended therefrom for adjustment between opposite operational positions at opposite sides of the frame; a plurality of reversible disc blades mounted in substantially equally spaced relation along the beam, there being a forwardmost disc blade movable between predetermined maximum spaced positions spaced transversely of each other with respect to the frame incident to movement of the beam between opposite operational positions; a pair of axially aligned ground engaging support wheels mounted on the frame with their common axis extended transversely of the frame between adjacent blades and on opposite sides of the beam, each of the support wheels being spaced a distance transversely of the frame less than the maximum predetermined spaced position of the forwardmost blade on its respective side of the frame; means connected to the beam for adjustably positioning the beam in the frame between its opposite operational positions; and laterally spaced, alternately employed depth control wheels mounted on opposite sides of the forward end portion of the frame forwardly of the forwardmost blade, each of the depth control wheels being spaced from the frame by an amount less than the maximum spacing of the forwardmost blade on its respective side of the frame.

2. In a reversible disc plow, an elongated longitudinal frame member having a forward end adapted for connection to a draft appliance and a rear end; a transverse frame member rigidly connected in normal relation to the longitudinal member in forwardly adjacent spaced relation to said rear end; ground support wheels individually mounted on the transverse member on opposite sides of the longitudinal member for rotation in upright planes substantially parallel to the longitudinal member and on a common axis in a substantially common upright plane with the transverse member, said common plane being substantially normal to the longitudinal member; an elongated plow beam extended under the frame members between the support wheels and having front and rear ends respectively extended forwardly and rearwardly of the rear end of the longitudinal member; means supported by the longitudinal member rearwardly of said common axis pivotally mounting the beam intermediate its ends for horizontal swinging movement between opposite operational positions on opposite sides of the longitudinal member; and a plurality of reversible disc blades mounted in the beam, the plow having a center of balance intermediate the ends of the longitudinal member substantially in said common plane whereby said plow is substantially longitudinally balanced on the support wheels.

3. In a reversible disc plow, an elongated longitudinal frame member having a forward end adapted for connection to a draft appliance, and a rear end; a transverse frame member rigidly, substantially right-angularly connected to the longitudinal frame member in forwardly spaced relation to said rear end; a pair of support wheels of predetermined uniform diameter; means individually mounting the wheels on the transverse member, substantially equidistantly outwardly spaced on opposite sides of the longitudinal member, and for rotation in substantially upright planes parallel to the longitudinal member about a common axis extended transversely of the longitudinal member below the transverse member; an elongated plow beam having front and rear ends; a plurality of disc blades mounted in the beam in substantially equally spaced relation therealong, there being a forwardmost blade and a relatively front and rear intermediate blades, the spacing between adjacent blades being substantially equal to the spacing between the wheels and being greater than the diameter of the wheels; axis means borne by the rear end of the longitudinal member, connected to the beam adjacent to said rear intermediate blade, and pivotally supporting the beam under the frame members and between the wheels for horizontal swinging movement between opposite operational positions with the front end on opposite sides of the longitudinal member, the transverse member being located between the front and rear intermediate blades, the forwardmost blade being movable between outermost positions, in said operational positions of the beam, laterally outwardly spaced from the wheels on their respective sides of the longitudinal frame member, the front intermediate blade being movable with the beam between opposite outer positions in closely forwardly adjacent spaced relation to the wheels; and stop means mounted on the frame engageable with the beam for precluding outward swinging movement beyond its opposite operational positions.

4. In a reversible disc plow, an elongated longitudinal frame member having a forward end adapted for connection to a draft appliance and a rear end; a transverse frame member rigidly connected in normal relation to the longitudinal member in forwardly adjacent spaced relation to said rear end; a plow beam; disc blades borne by the beam; means pivotally supporting the beam on the rear end of the longitudinal member and under the members for horizontal swinging movement; ground support wheels; means mounting the wheels on the transverse member in substantially equidistantly outwardly spaced relation to the longitudinal member, for rotation about a substantially common horizontal axis located in a predetermined plane disposed transversely of the longitudinal member, and for elevational adjustment relative to the frame members with their common axis moving upwardly and downwardly in said plane; and powered means borne by the frame members and connected to said mounting means for elevationally adjusting the wheels relative to the frame members.

5. The plow of claim 4 wherein said mounting means includes sleeves connected to the transverse member and legs individually slidably received in the sleeves rotatably supporting the wheels thereon; and wherein said powered means includes an elongated rock shaft rotatably supported by the transverse member in substantially parallel relation thereto, linkage means rigidly connected to the rock shaft and pivotally connected to the legs, a lever rigidly extended from the shaft, and a reciprocally powered member interconnecting the lever and the longitudinal member for rotating the rock shaft in opposite directions to slide the legs longitudinally within the sleeves.

6. The plow of claim 4 including a draft arm rigidly downwardly forwardly extended from the forward end of the longitudinal member in obtuse angular relation thereto, a tongue pivotally connected to the arm for elevational pivotal movement with respect to the arm and forwardly extended therefrom, and an elongated, longitudinally adjustable linkage pivotally interconnecting the arm and the tongue in spaced relation to the pivotal interconnection of the tongue and the arm for elevationally adjusting the tongue with respect to the arm.

References Cited in the file of this patent
UNITED STATES PATENTS

| | | |
|---|---|---|
| 714,570 | Fowler | Nov. 25, 1902 |
| 954,950 | Fowler | Apr. 12, 1910 |
| 2,676,524 | Bashor | Apr. 27, 1954 |

FOREIGN PATENTS

| | | |
|---|---|---|
| 4,453 | Great Britain | of 1875 |